UNITED STATES PATENT OFFICE.

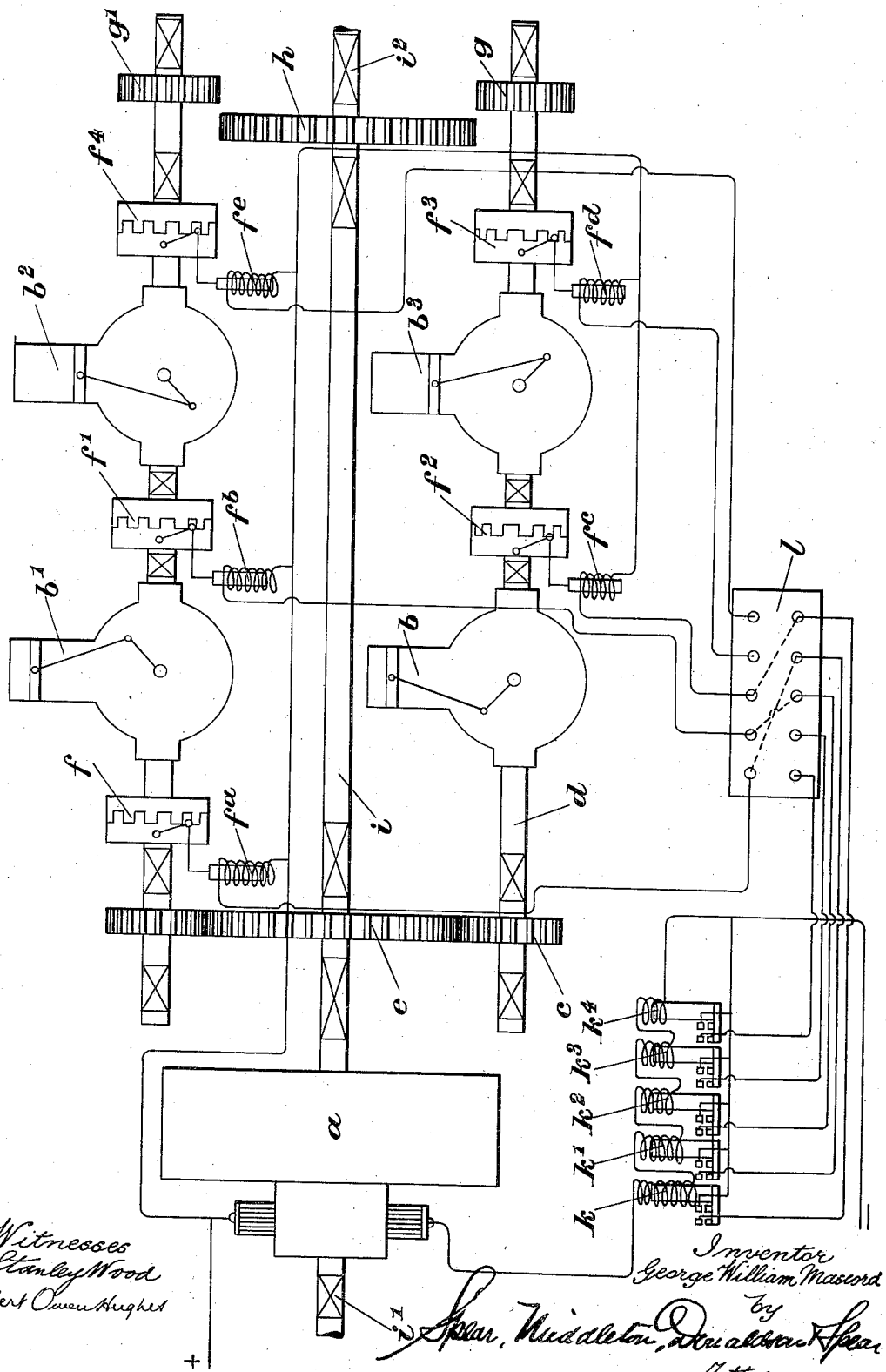

GEORGE WILLIAM MASCORD, OF LONDON, ENGLAND.

GENERATION AND TRANSMISSION OF MOTIVE POWER.

No. 891,350.  Specification of Letters Patent.  Patented June 23, 1908.

Application filed February 17, 1908. Serial No. 416,351.

To all whom it may concern:

Be it known that I, GEORGE WILLIAM MASCORD, a subject of the King of Great Britain and Ireland, residing at 5 The Crescent, Barnes, London, S. W., England, mechanician, have invented certain new and useful Improvements Relating to the Generation and Transmission of Motive Power, of which the following is a specification.

This invention relates to the generation and transmission of motive power and is applicable to motor vehicles or locomotives, and for other purposes where internal combustion engines are employed as the prime source of motive power, and where an electro-generator or generators and motor or motors are used for the distribution of the motive power to the points at which it is to be applied. It is or may be of general application as in an ordinary direct driven petrol or like vehicle where there is no intermediate electric generator or motor.

The principal object of the invention is to provide convenient means to overcome inertia and to augment the motive power at starting and when about to ascend gradients or when additional power exceeding the normal is required or from any other cause.

According to the invention I provide a supplementary motor unit set or sets capable of being automatically coupled to the main motor set either when running or before starting.

The clutch may be set into and out of operation by the use of a solenoid core or magnet energized on the development of a pre-determined power output, or number of watts of energy by the electro-generator.

The invention is illustrated in the accompanying drawing which is a diagrammatic plan of one form of motive power transmission apparatus provided according to the invention.

In carrying out the invention in the manner illustrated in the accompanying drawing I provide a dynamo $a$ to which four sets of engines $b$ $b'$ $b^2$ $b^3$ each of which sets consists of one or more cylinders are adapted to be connected.

The engine set $b$ is directly coupled to the dynamo $a$ through the pinion $c$ on its shaft $d$ and the spur wheel $e$ on the dynamo shaft $i$ while the engine sets $b'$ $b^2$ and $b^3$ are indirectly coupled thereto through the clutches $f$ $f'$ and $f^2$. Additional clutches $f^3$ and $f^4$ are provided whereby the drive may be transmitted when desired through the end $i^2$ of the driving shaft $i$ upon the spur wheel $h$ being brought into engagement with the pinion $g$ $g'$. The end $i'$ of the driving shaft is also preferably provided with means whereby additional engine sets may be coupled to it.

The clutches $f$ $f'$ $f^2$ $f^3$ and $f^4$ are respectively actuated by electromagnets $f^a$ $f^b$ $f^c$ $f^d$ $f^e$ energized by the dynamo $a$ through the solenoid switches $k$ $k'$, $k^2$, $k^3$, $k^4$ which are provided to be so adjusted as to be actuated at gradually increasing loads, for example if engine set $b$ is capable of exerting 20 horse power the automatic switch $k$ might be set so as to be operated when the load on the dynamo reaches 13.5 kilowatts so that at that load the electric magnet $f^c$ of clutch $f^2$ will be set into operation and the engine set $b^3$ will start and assist in driving the dynamo $a$. Similarly on the load reaching say 28.5 kilowatts the solenoid switch $k'$ would be actuated to set into operation the electro magnet $f^a$ of clutch $f$ by which the engine set $b'$ would be coupled to the dynamo $a$ while upon the load still increasing the engine set $b^2$ would be similarly automatically clutched in.

A plug connecting box $l$ is provided for the purpose of varying the electrical connections of the electro magnets $f^a$ $f^b$ $f^c$ $f^d$ $f^e$ to suit any desired combination. As shown they are connected to suit the described series of combinations.

It will be understood that any number of engine sets may be provided and that the invention is not limited to the exact construction described but covers generally the provision of supplementary motor sets which are automatically brought into operation upon the load increasing beyond predetermined amounts.

It will also be understood that any means may be employed to effect the operation of the clutch that is to say hydraulic, pneumatic, mechanical or electrical means may be employed automatically, without departing from the essential features of the invention.

What I claim as my invention and desire to secure by Letters Patent is:—

1. An apparatus for the generation and transmission of motive power comprising a main motor, a supplemental motor, and means for automatically clutching the supplemental motor to the main motor when the load increases beyond a predetermined amount.

2. An apparatus for the generation and transmission of motive power comprising a main motor, a supplemental motor, and electrical means for automatically clutching the supplemental motor to the main motor when the load increases beyond a predetermined amount.

In testimony whereof I have hereunto signed my name to this specification in the presence of two subscribing witnesses.

GEORGE WILLIAM MASCORD.

Witnesses:
JOHN WILLIAM STOUDWICK,
H. D. JAMESON.